United States Patent
Chen (10) Patent No.: US 12,210,271 B2
(45) Date of Patent: Jan. 28, 2025

(54) DRIVING MECHANISM COMBINED MEMBER, GIMBAL PHOTOGRAPHING DEVICE, AND PHOTOGRAPHING TERMINAL

(71) Applicant: HOHEM TECHNOLOGY CO., LTD., Guangdong (CN)

(72) Inventor: Min Chen, Shenzhen (CN)

(73) Assignee: HOHEM TECHNOLOGY CO., LTD., Shenzhen (CN)

( * ) Notice: Subject to any disclaimer, the term of this patent is extended or adjusted under 35 U.S.C. 154(b) by 43 days.

(21) Appl. No.: 17/425,606

(22) PCT Filed: Jan. 25, 2019

(86) PCT No.: PCT/CN2019/073251
§ 371 (c)(1),
(2) Date: Dec. 8, 2021

(87) PCT Pub. No.: WO2020/151013
PCT Pub. Date: Jul. 30, 2020

(65) Prior Publication Data
US 2024/0241430 A1 Jul. 18, 2024

(51) Int. Cl.
*G03B 17/56* (2021.01)
*F16M 11/12* (2006.01)
*G03B 17/12* (2021.01)

(52) U.S. Cl.
CPC ......... *G03B 17/561* (2013.01); *F16M 11/123* (2013.01); *G03B 17/12* (2013.01); *G03B 17/565* (2013.01); *F16M 2200/06* (2013.01); *G03B 2217/002* (2013.01)

(58) Field of Classification Search
USPC .......................................................... 396/428
See application file for complete search history.

(56) References Cited

U.S. PATENT DOCUMENTS

| | | | |
|---|---|---|---|
| 8,558,992 B2 * | 10/2013 | Steffey | G01S 7/491 356/3.01 |
| 2012/0105714 A1 | 5/2012 | Li et al. | |
| 2017/0192342 A1 * | 7/2017 | Liu | H04N 23/54 |

FOREIGN PATENT DOCUMENTS

| | | | |
|---|---|---|---|
| CN | 204350178 U | * | 5/2015 |
| CN | 205781776 U | | 12/2016 |
| CN | 205938391 U | * | 2/2017 |
| CN | 106877608 A | * | 6/2017 |
| CN | 206542305 U | * | 10/2017 |

(Continued)

OTHER PUBLICATIONS

Patent Cooperation Treaty: International Search Report for PCT/CN2019/073251; Sep. 29, 2019; 4 pages.

(Continued)

*Primary Examiner* — Clayton E. LaBalle
*Assistant Examiner* — Warren K Fenwick (57) ABSTRACT

Disclosed is a driving mechanism combined member, comprising a first actuator and a camera module. The first actuator comprises a housing, a stator, and a rotor, wherein the stator is arranged inside the housing, the rotor is of a hollow structure, and the rotor is rotatably arranged inside the stator. The camera module is arranged inside the rotor and is fixedly connected to the rotor, and an incident surface of the camera module faces an outer side of the housing.

20 Claims, 6 Drawing Sheets

(56) References Cited

FOREIGN PATENT DOCUMENTS

| | | | |
|---|---|---|---|
| CN | 107659758 A | | 2/2018 |
| CN | 108100284 A | | 6/2018 |
| CN | 108238273 A | | 7/2018 |
| CN | 207634925 U | | 7/2018 |
| CN | 209497532 U | | 10/2019 |
| CN | 209545713 U | | 10/2019 |
| FR | 3029264 A1 | * | 6/2016 |
| JP | 2007271392 A | * | 10/2007 |
| WO | WO-2017213339 A1 | * | 12/2017 ........... F16M 11/041 |

OTHER PUBLICATIONS

Chinese Patent Office: Office Action of CN 201910071362.2 (related application); May 24, 2024; 10 pages.
Chinese Patent Office: Office Action of CN 201910075130.4 (related application); May 14, 2024; 11 pages.

* cited by examiner

DRIVING MECHANISM COMBINED MEMBER, GIMBAL PHOTOGRAPHING DEVICE, AND PHOTOGRAPHING TERMINAL

CROSS-REFERENCE TO RELATED APPLICATIONS

This application is a U.S. National Phase application submitted under 35 U.S.C. § 371 of Patent Cooperation Treaty application serial no. PCT/CN2019/073251, filed Jan. 25, 2019, and entitled DRIVING MECHANISM COMBINED MEMBER, GIMBAL PHOTOGRAPHING DEVICE, AND PHOTOGRAPHING TERMINAL.

Patent Cooperation Treaty application serial no. PCT/CN2019/073251, published as WO 2020/151013, and is incorporated herein by reference.

TECHNICAL FIELD

The present disclosure relates to the technical field of photographing equipment, in particular to a driving mechanism assembly, a gimbal photographing device, and a photographing terminal.

BACKGROUND

Gimbal is a stabilizer of a photographing terminal such as a camera, a mobile phone and the like, which can achieve the effect of balancing and stabilizing the photographing terminal, and can maintain the stability of the photographing picture. In the conventional gimbal device, the photographing terminal is clamped on the gimbal and is directly driven by the motor to rotate, such that the photographing surface (the lens of the camera module) of the photographing terminal always faces the object to be photographed regardless of how the photographing terminal acts on the gimbal, thus achieving the physical anti-shake. However, the gimbal device in the prior art is too large in overall volume, is inconvenient to carry, and is not conducive to the development of miniaturization.

SUMMARY

Accordingly, it is necessary to provide a driving mechanism assembly, a gimbal photographing device, and a photographing terminal.

A driving mechanism assembly includes:
a first driving member including a housing, a stator, and a rotor, the stator being provided in the housing, the rotor being of a hollow structure, and the rotor is rotatably provided in the stator; and
a camera module provided in the rotor and fixed to the stator, wherein a light incident surface of the camera module faces an outer side of the housing.

A gimbal photographing device includes:
a driving mechanism assembly including a first driving member including a housing, a stator, and a rotor, the stator being provided in the housing, the rotor being of a hollow structure, and the rotor is rotatably provided in the stator; and a camera module provided in the rotor and fixed to the stator, wherein a light incident surface of the camera module faces an outer side of the housing;
a second driving member including a second fixing portion and a second rotation portion connected to each other, the second rotation portion being connected to the housing, the second rotation portion be capable of rotating with respect to the second fixing portion, a rotational axis of the second rotation portion being perpendicular to a rotational axis of the rotor.

A photographing terminal includes:
a main body; and
a driving mechanism assembly including a first driving member including a housing, a stator, and a rotor, the stator being provided in the housing, the rotor being of a hollow structure, and the rotor is rotatably provided in the stator; and a camera module provided in the rotor and fixed to the stator, wherein a light incident surface of the camera module faces an outer side of the housing.

A photographing terminal includes:
a main body; and
a gimbal photographing device a driving mechanism assembly including a first driving member including a housing, a stator, and a rotor, the stator being provided in the housing, the rotor being of a hollow structure, and the rotor is rotatably provided in the stator; and a camera module provided in the rotor and fixed to the stator, wherein a light incident surface of the camera module faces an outer side of the housing; a second driving member including a second fixing portion and a second rotation portion connected to each other, the second rotation portion being connected to the housing, the second rotation portion be capable of rotating with respect to the second fixing portion, a rotational axis of the second rotation portion being perpendicular to a rotational axis of the rotor.

These and other objects, advantages, purposes and features will become apparent upon review of the following specification in conjunction with the drawings.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION

The above objects, features and advantages of the present invention will become more apparent by describing in detail embodiments thereof with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
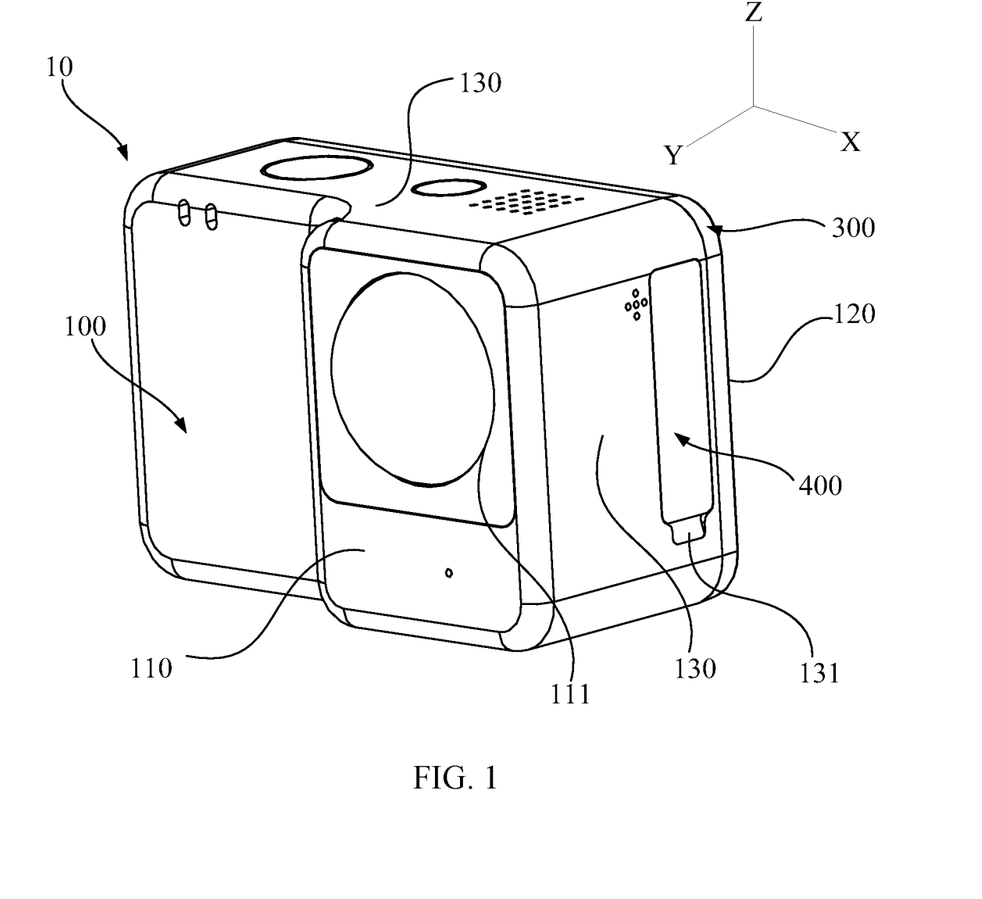
FIG. 1 is a schematic diagram of a photographing terminal according to an embodiment of the present disclosure.
Figure 2:
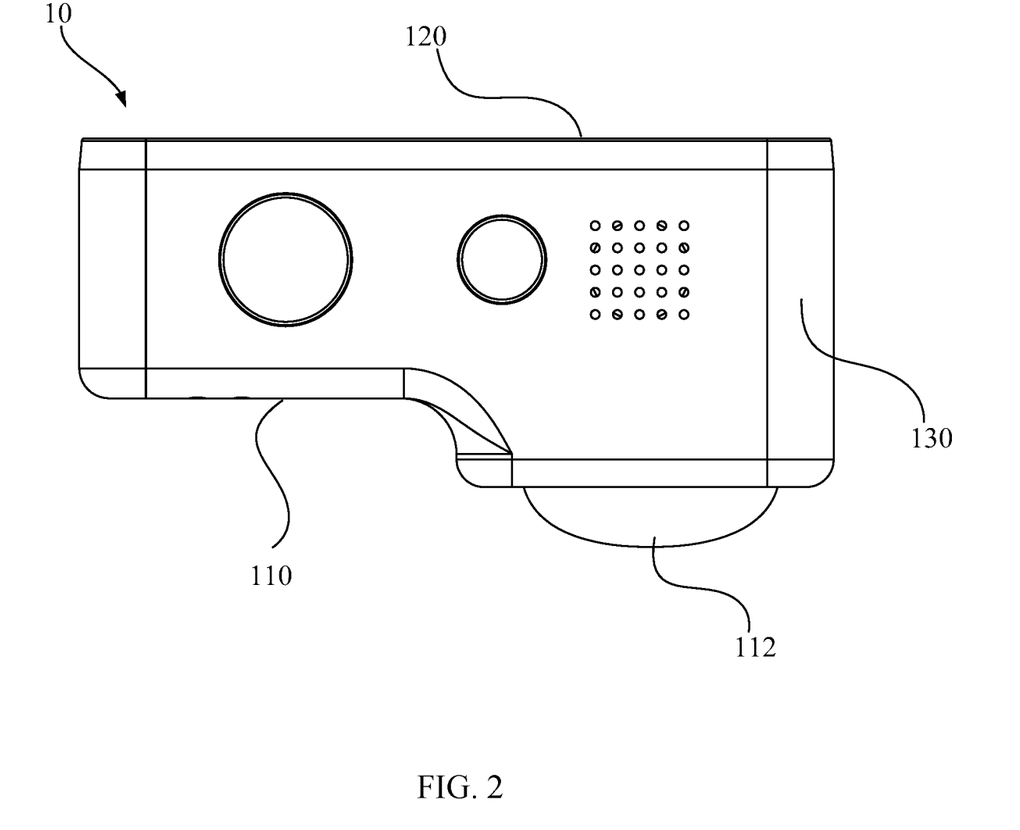
FIG. 2 is a top view of the photographing terminal of FIG. 1.
Figure 3:
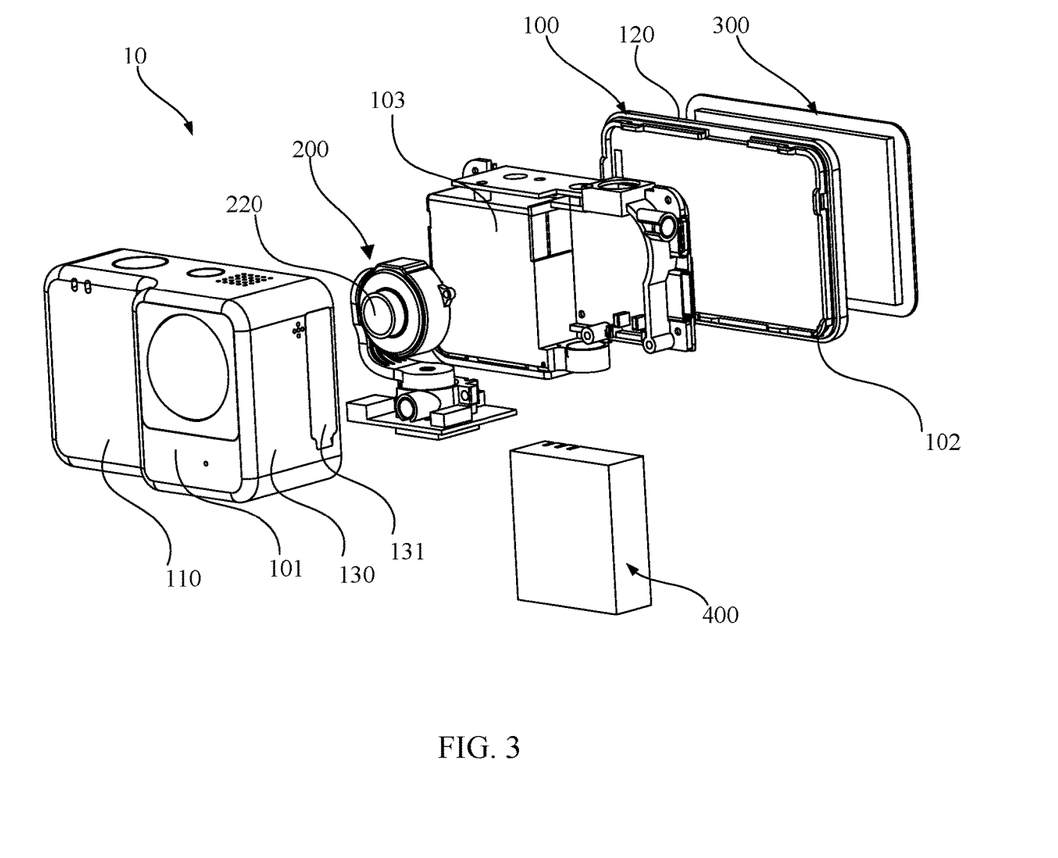
FIG. 3 is an exploded view of the photographing terminal of FIG. 1.

Referring to FIG. 1 to FIG. 3, a gimbal photographing device 200 according to an embodiment of the present disclosure is used for imaging a photographed object. The gimbal photographing device 200 can adjust the change of the photographing azimuth in the photographing process, so as to optimize the imaging quality problem caused by the shake deviation in the photographing process. The gimbal photographing device 200 can be used directly, or can be applied to a photographing terminal 10, such that the photographing terminal 10 can have a function of image stabilization. In one embodiment, the photographing terminal 10 includes a main body 100 and the gimbal photographing device 200 provided in the main body 100. In one embodiment, the photographing terminal 10 is a camera (e.g., digital still camera). It should be understood that, in other embodiments, the photographing terminal 10 may also be an intelligent terminal with camera function, such as a smart phone, a notebook computer, a tablet computer, a portable telephone, a video phone, an electronic book reader, a portable multimedia player (PMP), a mobile medical device, a wearable device, etc.

The conventional photographing terminals are usually clamped on the gimbal and are driven to rotate via a motor, so as to achieve physical anti-shake and achieve the stability of shooting pictures of the photographing terminal. However, the gimbal and the photographing terminal are independently provided, which occupy a large volume, and the installation and use are complicated. The gimbal photographing device 200 of the present disclosure is integrated into the photographing terminal 10, which can reduce the volume of the whole gimbal photographing device 200. The user can directly use the photographing terminal 10 to adjust the change of the shooting azimuth in the photographing process through the gimbal photographing device 200 inside the photographing terminal 10, so as to optimize the imaging quality problem caused by the shake deviation in the photographing process.

The main body 100 is an assembly carrier of the gimbal photographing device 200, which can be made of a metallic material, such as aluminum, aluminum alloy, or stainless steel, etc. Of course, the main body 100 can also be made of a non-metallic material such as plastic. The main body 100 includes a first mounting surface 110, a second mounting surface 120, which are oppositely arranged to each other, and a side surface 130 connecting the first mounting surface 110 and the second mounting surface 120. The opposite arrangement can be understood as, for example, along a thickness direction of the side surface 130 (the Y-axis direction in FIG. 1), assuming a point position in the middle of the side surface 130 defines a reference surface parallel to the XZ plane, then all points on the first mounting surface 110 are located on one side of the reference surface, and all points on the second mounting surface 120 are located on the other opposite side of the reference surface.

The first mounting surface 110 of the main body 100 is provided with a light through hole 111, which is used for a camera module 220 of the gimbal photographing device 200 to receive light. In one embodiment, the first mounting surface 110 of the main body 100 is provided with an optical lens 112 covering the light through hole 111, and the optical lens 112 protrudes from one side away from the camera module 220. In other words, the optical lens 112 protrudes from the main body 100, such that the lighting range of the camera module 220 in the gimbal photographing device 200 can be fully expanded. In one embodiment, the photographing terminal 10 further includes a display screen 300 mounted on the second mounting surface 120 of the main body 100. The display screen 300 can be a Liquid Crystal display (LCD) or an Organic Light Emitting Diode (OLED) display screen. In one embodiment, the display screen 300 is a touch display screen, and the user can perform a touch operation by touching the information presented by the display screen 300. For example, the camera module 220 in the gimbal photographing device 200 can be triggered by a touch operation to perform the photographing instruction. In other embodiments, the display screen 300 may also be a non-touch display screen for displaying information only. In other embodiments, the display screen 300 may also be omitted. The side surface 130 of the main body 100 can be provided with such structures as grooves or holes to mount a peripheral element to achieve a detachably connection between the specific element and the photographing terminal 10, as a channel for signal input and output of sound or the like, or as a channel for heat dissipation of working components within the photographing terminal 10. In one embodiment, the side surface 130 of the main body 100 is provided with a battery mounting groove 131 for mounting a battery 400.

In one embodiment, the main body 100 includes a front housing 101, a rear housing 102, and a middle frame 103. The front housing 101 is connected to the rear housing 102 to form an accommodating cavity. The middle frame 103 is provided in the accommodating cavity. The gimbal photographing device 200 is connected to the middle frame 103, and the front housing 101 and the rear housing 102 are used to seal the gimbal photographing device 200 mounted on the middle frame 103. At that time, an end surface of a side of the front housing away from the middle frame 103 is the first mounting surface 110, an outer wall surface of the front housing 101 is the side surface 130 of the main body 100, and an end face of the rear housing 102 away from the middle frame 103 is the second mounting surface 120.

Figure 4:
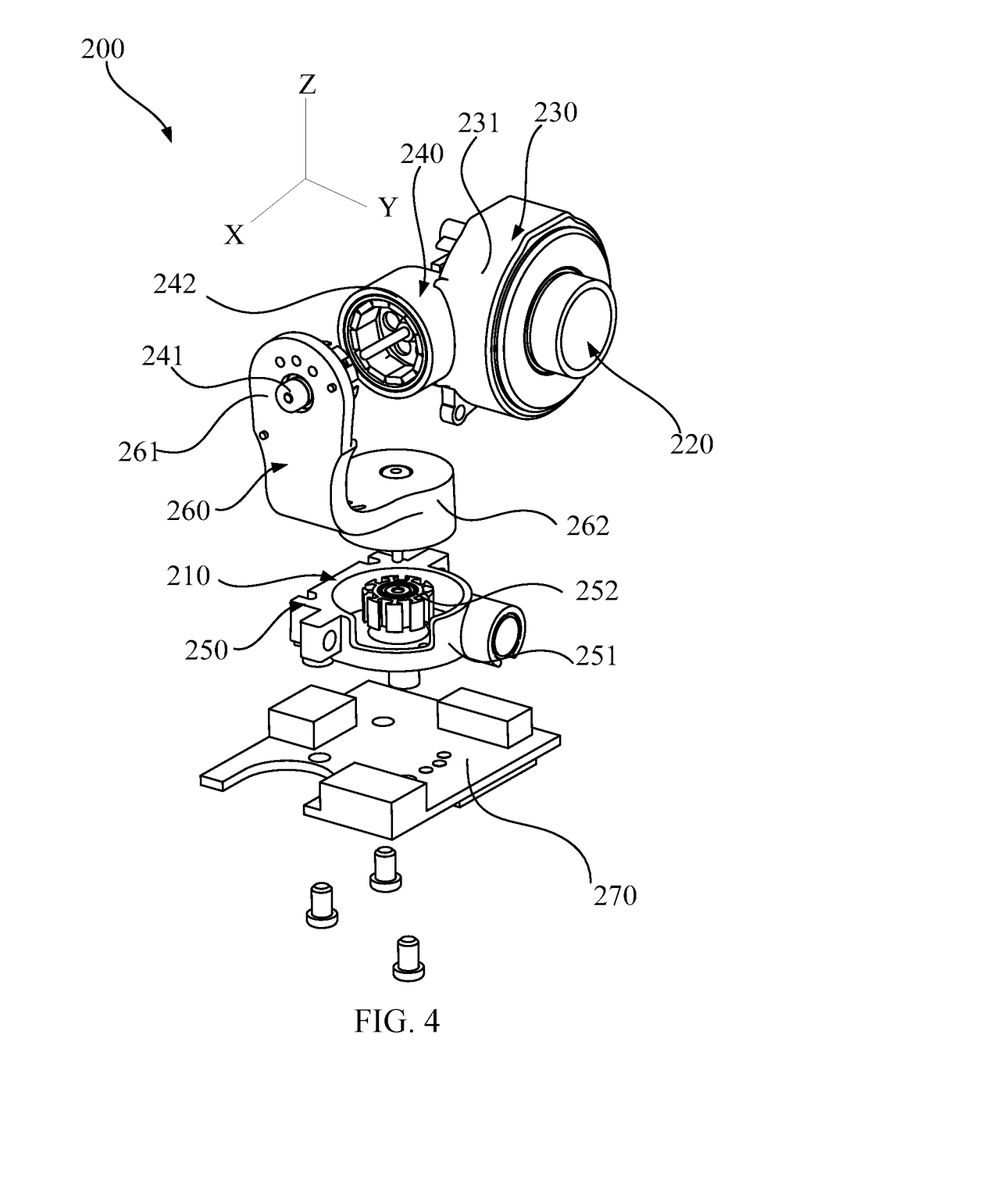
FIG. 4 is an exploded view of a gimbal photographing device of FIG. 3.
Figure 5:
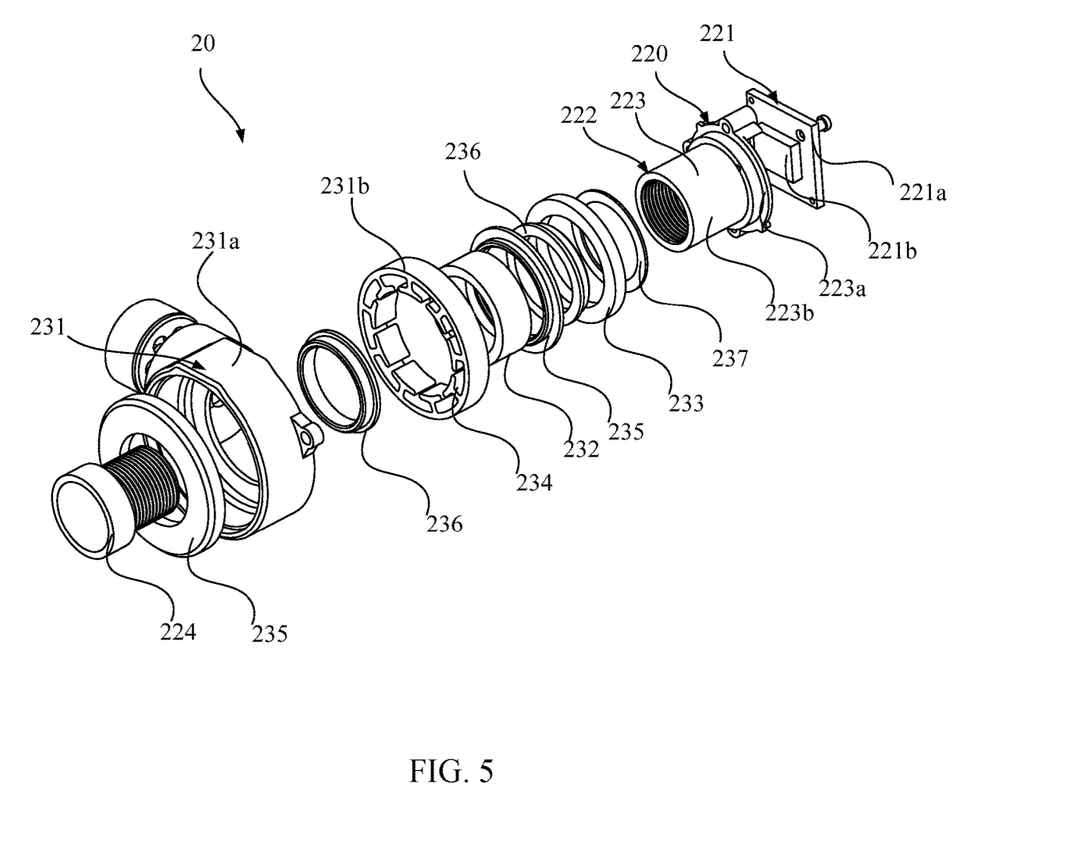
FIG. 5 is an exploded view of a driving mechanism assembly of FIG. 4.

Referring to FIG. 4 and FIG. 5, in one embodiment, the gimbal photographing device 200 includes a driving module 210 and the camera module 220. The driving module 210 is used to control the shooting orientation of the camera module 220, so as to enable the camera module 220 to achieve an optical anti-shake during the photographing process. In other words, when the camera module 220 shakes during the photographing process, in order to eliminate the displacement deviation caused by the shake in the photographing process, the driving module 210 can act on the camera module 220 to produce an acting force that counteracts the displacement deviation to achieve the stabilizing function of the gimbal photographing device 200.

In one embodiment, the driving module 210 includes a first driving member 230, a second driving member 240, and a third driving member 250. The first driving member 230, the second driving member 240, and the third driving member 250 cooperate to achieve stable and multi-angle photographing (three-axis stabilization) of the photographing terminal 10.

The first driving member 230 includes a first fixing portion 231 and a first rotation portion 232 that are connected to each other. The first rotating portion 232 can rotate with respect to the first fixing portion 231. A rotational axis of the first rotation portion 232 extends in a first direction, which can be regarded as a direction parallel to the Y-axis in FIG. 4. The camera module 220 is connected to the first rotation portion 232 and is rotatable along with the first rotation portion 232.

The second driving member 240 includes a second fixing portion 241 and a second rotation portion 242 that are connected to each other. The second rotation portion 242 can rotate with respect to the second fixing portion 241. A rotation axis of the second rotation portion 242 extends in a second direction, which may be regarded as a direction parallel to the X-axis in FIG. 4. The second rotation portion 242 is connected to the first fixing portion 231, i.e., the first diving member 230 is rotatable along with the second rotation portion 242. In one embodiment, the gimbal photographing device 200 includes a first arm rod, which includes a first free end and a first movable end. The first free end is connected to the housing 231a, and the first movable end is connected to the first rotation portion 242. The first arm rod serves as an intermediate member to prevent the first driving member 240 and the second driving member 250 from being directly connected to generate interference, which is unfavorable for adjusting the shooting orientation of the camera module 220. Meanwhile, the first arm rod can facilitate the disassembly and assembly of the first driving member 240 and the second driving member 250, and also makes the gimbal photographing apparatus 200 more attractive.

The third driving member 250 includes a third fixing portion 251 and a third rotation portion 252 that are connected to each other. The third rotation portion 252 can rotate with respect to the third fixing portion 251. A rotation axis of the third rotation portion 252 extends in a third direction, which may be regarded as a direction parallel to the Z-axis in FIG. 4. The third rotating portion 252 is connected to the second fixing portion 241, and the second driving portion 240 is rotatable along with the third rotating portion 252. In an embodiment, the gimbal photographing device 200 includes a second arm rod 260. The second arm rod 260 includes a second free end 261 and a second movable end 262. The second free end 261 is connected to the second fixing portion 241, and the second movable end 262 is connected to the third rotating portion 252. As such, the second arm rod 260 serves as an intermediate member to prevent the second driving member 240 and the third driving member 250 from being directly connected to generate interference, which is unfavorable for adjusting the shooting orientation of the camera module 220. Meanwhile, the second arm rod 260 can facilitate the disassembly and assembly of the second driving member 240 and the third driving member 250, and also makes the gimbal photographing apparatus 200 more attractive.

It should be noted that the first direction is perpendicular to the second direction, and the second direction is perpendicular to the third direction. When the gimbal photographing device 200 is in the balanced state, the first direction is perpendicular to the third direction. In other words, when the gimbal photographing device 200 is in the balanced state, the first direction, the second direction, and the third direction are perpendicular to one another. In addition, each of the three driving members is a motor, and the fixing portion is a stator of the motor (the fixing portion also includes a housing of the motor), and the rotation portion is a rotor of the motor. The rotation portions may rotate 360 degrees with respect to the fixing portion. Moreover, the rotating portion can be automatically rotated under the electric control effect, or be driven to rotate by an external force (e.g., manual force) in a state where the motor is turned off.

In other embodiments, the gimbal photographing device 200 may also achieve a bi-axial stabilization. In that case, the third driving member 250 can be omitted. In addition, when the gimbal photographing device 200 only requires a single-axial stabilization, the second driving member 240 and the third driving member 250 can be omitted, while the first driving member 230 and the camera module 220 can form the drive mechanism assembly 20 for implementing a single-axis stabilization.

In one embodiment, the first driving member 230 includes a housing 231a, a stator 231b, and a rotor. The housing 231a and the stator 231b are the first fixing portion 231, and the rotor is the first rotation portion 232. The stator 231b is provided in the housing 231a. The rotor is of a hollow structure, and the rotor is rotatably provided in the stator 231b. In one embodiment, the stator 231b includes an enameled wire 233 (equivalent to an outer magnet) and a stator core 234 sleeved on the enameled wire 233. The rotor includes an inner magnet, which is provided on the inner side of the enameled wire 233. Thus, the rotor is driven to rotate by the interaction of the magnetic force between the inner magnet and the outer magnet.

The camera module 220 is provided in the rotor and is fixedly connected to the rotor. In one embodiment, the camera module 220 includes a photosensitive assembly 221 and a lens assembly 222. The lens assembly 222 is provided on a photosensitive path of the photosensitive assembly 221. The lens assembly 222 includes a lens barrel 223 and a lens 224 provided in the lens barrel 223, and the rotor is sleeved on the lens barrel 223. As such, the rotation of the rotor can drive the lens holder 223 to rotate, thereby achieving synchronous rotation of the camera module 220 and the rotor. The lens barrel 223 and the lens 224 provided in the lens barrel 223 can be regarded as an output axis of the first driving member 230. The camera module 220 is disposed within the first driving member 230 to reduce the thickness of the whole device. In one embodiment, the photosensitive assembly 221 includes a circuit board 221a and a photosensitive chip 221b. The photosensitive chip 221b is provided on the circuit board 221a and is electrically connected to the circuit board 221a. The lens barrel 223 includes a base body 223a and a barrel body 223b. The base body 223a is connected to the circuit board 221a and surrounds the photosensitive chip 221b. The barrel body 223b is provided at an end of the base body 223a away from the circuit board 221a, and the rotor is sleeved on the barrel body 223b. In one embodiment, a central axis of the lens 224 coincides with the axis of rotation of the rotor, i.e., the camera module 220 rotates coaxially with the rotor.

In one embodiment, the first driving member 230 includes a shaft sleeve 235 connected to both ends of the housing 231a, and a bearing 236 connected to an inner ring of the shaft sleeve 235. The barrel body 223b extends through the bearing 236. As such, the bearing 236 can support the barrel body 233b, and the friction coefficient of the barrel body 223b during the rotating process can be reduced, thereby ensuring the rotating precision thereof. The bearing 236 may be a sliding bearing or a rolling bearing.

In one embodiment, the driving mechanism assembly 20 further includes a gasket 237 sleeved on the barrel body 223b, and the gasket 237 is sandwiched between the rotor and the base body 223a, so as to reduce wear of the barrel body 223b during rotation and to achieve a damping function. The gasket 237 can be, but not limited to, an elastomeric gasket such as a plastic gasket, a silicone gasket, etc.

In the gimbal photographing device 200, the camera module 220 is provided in the rotor and fixedly connected with the rotor, such that the camera module 220 can synchronously rotate under the driving of the rotor, so as to achieve physical anti-shake, and the imaging stability of the camera module 220 is improved. Since the camera module 220 is integrated into the first driver 230 (e.g., motor), compared with the conventional configuration in which the motor and the camera module are separated, the overall thickness of the device is reduced, the size is smaller, and it is easy to carry.

Figure 6:
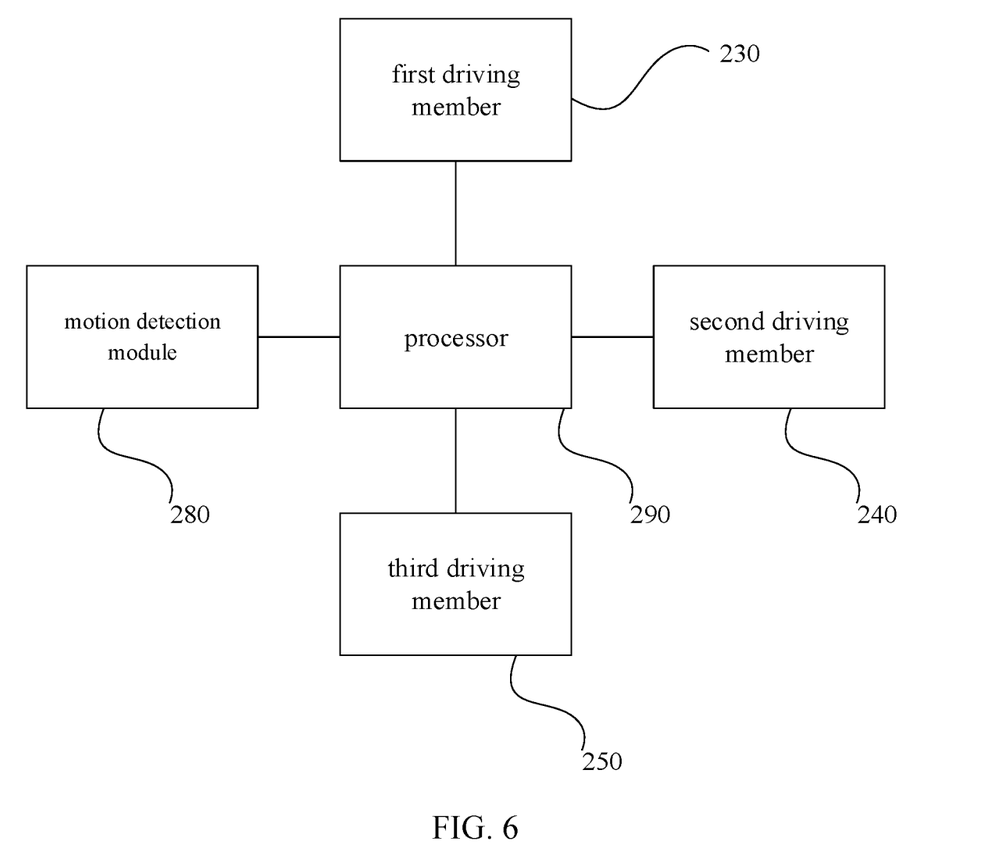
FIG. 6 is a schematic diagram of a control system of the gimbal photographing device.

In one embodiment, as shown in FIG. 6, the gimbal photographing device 200 includes a motion detection module 280 and a processor 290. The motion detection module 280 may be a gyroscope, which may be provided on the lens barrel 223 to rotate synchronously with the lens barrel 223. The motion detection module 280 is connected to the processor 290 and is capable of transmitting a change of an azimuth angle of the camera module 220 to the processor 290. The processor 290 is connected to the first driving member 230, the second driving member 240, and the third driving member 250, respectively, and is capable of controlling rotation angles of the first driving member 230, the second driving member 240, and the third driving member 250 according to a test result of the motion detection module 280.

When using the gimbal photographing device 200 or the photographing terminal, if the user changes the shooting orientation, the azimuth angle of the axis of the motion detection module 280 will vary, meanwhile, the motion detection module 280 transmits the change signal of the azimuth angle to the processor 290, the processor 290 can calculate an angle that the first rotation portion 232 needs to rotate, an angle that the second rotation portion 242 needs to rotate, and an angle that the third rotation 252 portion needs to rotate based on the algorithm. The direction of rotation of the first rotation portion 232, the direction of rotation of the second rotation portion 242, and the direction of rotation of the third rotation portion 252 are each opposite to the direction corresponding to the azimuth of the axis of the motion detection module 280. As such, even if the gimbal photographing device 200 or the photographing terminal 10 is moving, the camera module 220 is always in the initial position, thereby ensuring the stability of the photographing.

In one embodiment, the gimbal photographing device 200 further includes a motherboard 270 and a key assembly (not shown). The key assembly can be provided on an outer surface of the main body 100. The key assembly is connected to the motherboard 270 and can transmit an action instruction to the motherboard 270. The motherboard 270 is connected to the first driving portion 230, the second driving portion 240, and the third driving portion 250, respectively, and it can control the rotation angle of the first rotating portion 232, the rotating angle of the second rotating portion 242, and the angle of rotation of the third rotating portion 252 according to the action instruction.

In one embodiment, the key assembly may include a power key, a rocker key, and a function key. The power key is used for controlling the on/off of the gimbal photographing device 200 and switching the photo and video functions of the camera module 220. The rocker key is used to control the orientation of the camera module 220, such as the roll motion (driven by the first driving member 230), the pitch motion (driven by the second driving member 240), and the yaw motion (driven by the third driving member 250) of the camera module 220. A plurality of functional keys may be provided, some of which may be used to adjust the photographing focal length of the camera module 220, some of which may be used to control the operating modes of the various driving members, such as locking and following modes. It should be noted that the number of keys included in the key assembly, as well as the functions of each of the keys, may vary depending on the actual use requirements, which are not limited hereto.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A driving mechanism assembly, comprising:
a first driving member comprising a housing, a stator, and a rotor, the stator being provided in the housing, the rotor being of a hollow structure having a receiving hole, and the rotor being rotatably provided in the stator; and
a camera module provided in the receiving hole of the rotor and fixed to the rotor, wherein a light incident surface of the camera module faces an outer side of the housing.

2. The driving mechanism assembly according to claim 1, wherein the camera module comprises a photosensitive assembly and a lens assembly, the lens assembly is provided in a photosensitive path of the photosensitive assembly, the lens assembly comprises a lens barrel and a lens provided in the lens barrel, and the rotor is sleeved on the lens barrel.

3. The driving mechanism assembly according to claim 2, wherein the photosensitive assembly comprises a circuit board and a photosensitive chip, the photosensitive chip is provided on the circuit board and is electrically connected to the circuit board, the lens barrel comprises a base body and a barrel body, the base body is connected to the circuit board and surrounds the photosensitive chip, the barrel body is provided at an end of the base body away from the circuit board, and the rotor is sleeved on the barrel body.

4. The driving mechanism assembly according to claim 3, further comprising a gasket sleeved on the barrel body, wherein the gasket is sandwiched between the rotor and the base body.

5. The driving mechanism assembly according to claim 3, wherein the first driving member comprises a shaft sleeve connected to both ends of the housing, and a bearing connected to an inner ring of the shaft sleeve, the barrel body extends through the bearing.

6. The driving mechanism assembly according to claim 2, wherein a central axis of the lens coincides with a rotational axis of the rotor.

7. The driving mechanism assembly according to claim 1, wherein the stator comprises an enameled wire and a stator core sleeved on the enameled wire, the rotor comprises an inner magnet provided on an inner side of the enameled wire.

8. A photographing terminal, comprising:
a main body; and
the driving mechanism assembly according to claim 1 provided in the main body.

9. The photographing terminal according to claim 8, wherein the main body comprises a front housing, a rear housing, and a middle frame, the front housing is connected to the rear housing to form an accommodating cavity, the middle frame is provided in the accommodating cavity, the driving mechanism assembly is connected to the middle frame.

10. The photographing terminal according to claim 9, wherein the photographing terminal comprises a touch display screen provided on the rear housing.

11. The photographing terminal according to claim 9, wherein the front housing is provided with a light through hole, a photosensitive path of the camera module extends through the light through hole, an outside of the front housing is provided with an optical lens covering the light through hole, and the optical lens protrudes from one side away from the camera module.

12. A gimbal photographing device, comprises:
the driving mechanism assembly according to claim 1;
a second driving member comprising a second fixing portion and a second rotation portion connected to each other, the second rotation portion being connected to the housing, the second rotation portion be capable of rotating with respect to the second fixing portion, a rotational axis of the second rotation portion being perpendicular to a rotational axis of the rotor.

13. The gimbal photographing device according to claim 12, further comprising a third driving member, wherein the third driving member comprises a third fixing portion and a third rotation portion connected to each other, the third rotation is connected to the second fixing portion, the third rotation is capable of rotating with respect to the third fixing portion, a rotational axis of the third rotation portion is perpendicular to a rotational axis of the second rotation portion, when the gimbal device is in a balanced state, the rotational axis of the third rotation portion is perpendicular to the rotational axis of the rotor.

14. The gimbal photographing device according to claim 13, further comprising a first arm rod, wherein the first arm rod comprises a first free end and a first movable end, the first free end is connected to the housing, and the first movable end is connected to the second rotation portion.

15. The gimbal photographing device according to claim 13, further comprising a second arm rod, wherein the second arm rod comprises a second free end and a second movable end, the second free end is connected to the second fixing portion, and the second movable end is connected to the third rotation portion.

16. The gimbal photographing device according to claim 13, further comprising a motion detection module and a processor, wherein the motion detection module is connected to the processor and is capable of transmitting a change of an azimuth angle of the camera module to the processor, the processor is connected to the first driving member, the second driving member, and the third driving member, respectively, and is capable of controlling rotation angles of the first driving member, the second driving member, and the third driving member according to a test result of the motion detection module.

17. A photographing terminal, comprising:
a main body; and
the gimbal photographing device according to claim 12 provided in the main body.

18. The photographing terminal according to claim 17, wherein the main body comprises a front housing, a rear housing, and a middle frame, the front housing is connected to the rear housing to form an accommodating cavity, the middle frame is provided in the accommodating cavity, the gimbal photographing device is connected to the middle frame.

19. The photographing terminal according to claim 18, wherein the photographing terminal comprises a touch display screen provided on the rear housing.

20. The photographing terminal according to claim 18, wherein the front housing is provided with a light through hole, a photosensitive path of the camera module extends through the light through hole, an outside of the front housing is provided with an optical lens covering the light through hole, and the optical lens protrudes from one side away from the camera module.

* * * * *